Patented Nov. 14, 1950

2,530,332

UNITED STATES PATENT OFFICE 2,530,332

SEPARATION OF TERTIARY MONOHEXENES AND PREPARATION OF 2-METHYLPENTANOL-2

Boyd E. Hudson, Jr., Cranford, N. J., assignor to Standard Oil Development Company, a corporation of Delaware No Drawing. Application February 5, 1948, Serial No. 6,561

17 Claims. (Cl. 260—639)

This invention relates to a process for the separation of certain tertiary monohexenes from hydrocarbon mixtures containing any or all the other isomeric tertiary monohexenes. More specifically, the invention relates to a process whereby certain tertiary monohexenes are separated from other tertiary monohexenes by selective extraction employing aqueous strong acids, having catalytic hydrating activity such as sulfuric acid, the sulfonic acids, such as the aromatic sulfonic acids and the aliphatic sulfonic acids, e. g. benzenesulfonic acid, ethane sulfonic acid, etc.

It is well known in the art that so-called tertiary mono-olefins may be selectively extracted from hydrocarbon mixtures containing tertiary mono-olefins and isomeric non-tertiary monoolefins by means of strong acids, particularly aqueous strong acids. For example, isobutylene, which is converted to a tertiary alcohol by acid-catalyzed hydration, is extracted commercially from mixtures of $C_4$ hydrocarbons containing both olefinic and paraffinic members by means of 55–70% sulfuric acid. Also in the $C_5$ series, 2-methylbutene-1 and 2-methylbutene-2, both of which form tertiary amyl alcohol on hydration are simultaneously extracted by aqueous strong acids preferentially over the other $C_5$ mono-olefins, none of which is converted to tertiary amyl alcohol without first being isomerized.

It has now been found that one tertiary monohexene or group of tertiary monohexenes can be separated from other tertiary monohexenes by selective extraction with aqueous strong acids having catalytic hydrating activity, preferably the sulfonic acids, i. e. those organic acids corresponding to the formula R—$SO_2$—OH where R represents an aromatic, a cyclo-aliphatic, or an aliphatic radical. Although the selective extraction contemplated by this invention may be carried out with aqueous strong polybasic mineral acids such as sulfuric acid, certain control must be exercised with these acids so as to avoid excessive polymerization of the tertiary monohexenes. Excessive polymerization may be controlled, for example, by the modification of the mineral acid with added amounts of sulfonic acids such as benzenesulfonic acid; by the use of low temperature, etc.

Benzenesulfonic acid, ethanesulfonic acid, etc., are typical acids of the sulfonic series which are preferably employed in this invention.

Specifically, it has been found that 2-methylpentene-1 and/or 2-methylpentene-2 (both of which form a tertiary alcohol, 2-methylpentanol-2 on hydration), can be selectively extracted over:

(1) 3-methylpentene-2 (which on hydration yields 3-methylpentanol-3, another tertiary alcohol), (2) The tertiary monohexene isomers 2,3-dimethylbutene-1 and 2,3-dimethylbutene-2 (which on hydration yields 2,3-dimethylbutanol-2), (3) The tertiary monohexene 2-methylbutene-1, and (4) Any other $C_6$ mono-olefin or paraffin.

The $C_6$-diolefins, i. e. the hexadienes do not undergo hydration under the conditions employed. They usually polymerize or enter into copolymerization reactions.

Some of the $C_6$ tertiary mono-olefins mentioned above are uncommon materials and do not appear in $C_6$ olefin cuts usually formed in petroleum processing of mineral oil, e. g. by cracking, polymerization, etc. Typical composition of a cracked $C_6$-petroleum refinery cut is as follows:

| | Catalytic | Thermal |
|---|---|---|
| Percent total unsaturation | 53 | 50–60 |
| Percent tertiary olefins | 39 | 50–60 |

Thermodynamic calculations below show that the $C_6$ tertiary olefins are composed predominantly of 2- and 3-methylpentenes:

| Tertiary Olefin [1] | Per Cent on Total Olefin | Per Cent on Tertiary Olefin |
|---|---|---|
| 2,3-Dimethylbutene-2 | 4.9 | 6.7 |
| 2,3-Dimethylbutene-1 | 6.6 | 9.0 |
| 2-Ethylbutene-1 | 4.0 | 5.5 |
| trans-3-Methylpentene-2 | 16.6 | 22.9 |
| cis-3-Methylpentene-2 | 10.8 | 14.8 |
| 2-Methylpentene-2 | 17.1 | 23.6 |
| 2-Methylpentene-1 | 13.0 | 17.1 |
| | 73.0 | 99.6 |

[1] Cf. J. Res. N. B. S., vol. 36, p. 597, June 1946.

Infra-red analysis of the hydrogenation product of a $C_6$-olefin concentrate obtained from a refinery naphtha indicates a maximum of 6% 2,3-dimethylbutenes-1 and -2, based on original olefins as follows:

| Type | Per Cent Found |
|---|---|
| $C_6$ Straight Chain | 9 |
| 3-Methyl $C_5$ | 29 |
| 2-Methyl $C_5$ | 56 |
| Unidentified, including 2,3-dimethyl $C_4$ | 6 |
| | (100) |

The original $C_6$ olefin concentrate was analyzed for the olefin types $R_2C=CH_2$ and $R_2C=CHR$ by means of infra-red spectroscopy. The results below indicate a close correspondence of the ratio of the first type to the second with the ratio predicted by thermodynamics:

| Compound in Group | Per Cent Predicted [1] | Per Cent Found in Concentrate |
|---|---|---|
| $R_2C=CH_2$: | | |
|   2-Methylpentene-1 | 17.1 ⎫ | |
|   2-Ethylbutene-1 | 5.5 ⎬ 31.6 | 24 |
|   2,3-Dimethylbutene-1 | 9.0 ⎭ | |
| $R_2C=CHR$: | | |
|   2-Methylpentene-2 | 23.6 ⎫ | |
|   cis-3-Methylpentene-2 | 14.8 ⎬ 61.3 | 52 |
|   trans-3-Methylpentene-2 | 22.9 ⎭ | |
| Group Ratio | 0.51 | 0.47 |

[1] On basis of total tertiary olefins.

It is to be construed from this, that the $C_6$ tertiary olefins exist essentially at the equilibrium distribution predicted by thermodynamics, and that the specific compounds 2,3-dimethylbutenes-1 and -2 and 2-ethylbutene-1 comprise a vanishingly small fraction of the $C_6$ tertiary olefins in refinery naphthas.

In the selective extraction process benzenesulfonic acid of 70–85 wt. percent concentration is preferred because of its selectivity and low polymerization tendencies. The process for carrying out the acid extraction need not be described here in great detail because the steps involved are conventional and well known in the extraction art. The process may be carried out either in batch or continuous operation in one or more stages. The temperture at which the desired selective extraction is carried out is important but not critical. In general, as low a temperature as is consistent with avoiding solidification of the acid extractant is preferred on the basis of acid efficiency, while somewhat higher temperature allows speedier operations. Temperatures in the range of $-10°$ C. to $+40°$ C. are preferred.

The extraction process is conveniently carried out by absorbing the mixture of $C_6$ mono-olefins containing the $C_6$ tertiary isomers in strong aqueous acid, e. g. 70–85 wt. percent benzenesulfonic acid. The olefin is preferably countercurrently passed upwardly through an agitated stream of the aqueous acid in an absorption vessel and the resulting acid liquor is withdrawn from the bottom of the absorption vessel.

Experiments bearing on the separation of 2-methylpentene-1 and 2-methylpentene-2 from 3-methylpentene-2 gave the following results:

*Equilibrium selectivity at 25° C.*

[80 weight per cent benzenesulfonic acid (hydrocarbon-free basis).]

| Olefin (S) | 2-Methylpentenes-1 and 2 | 3-Methylpentene-2 |
|---|---|---|
| Corresponding Alcohol | 2-methylpentanol-2 | 3-methylpentanol-3. |
| Initial Olefin Content of Extract, Mols olefin/mol acid | 0.20 | (a) 0.50, (b) 0.20. |
| Mol Per Cent Olefin in Naphtha Phase after Agitation: | | |
|   1 hr | 4.7 | (a) 17.6, (b) 7.7. |
|   Final, 3 to 5 hrs | 4.8 | (a) 21.4–22.4, (b) 9.2. |
| Final Olefin Content of Extract, mols olefin/mol acid | 0.11 | (a) 0.048, (b) 0.037. |
| Mols olefin/mol acid in Extract per mol per cent Olefin in naptha. | 0.023 | (a) 0.0028, (b) 0.0041. Average (a) and (b), 0.0035. |

Intrinsic selectivity 0.023/0.0035=6.5/1 favoring 2-methylpentenes.

The data from the above absorption-desorption experiments indicate that the extraction equilibrium is extremely unfavorable for 3-methylpentene-2, but is relatively much more favorable for the 2-methylpentenes-1 and 2. In terms of extract saturation and the mol percent olefin in the naptha phase at equilibrium, an intrinsic selectivity of about 6.5 to 1 is apparent favoring the extraction of the latter tertiary hexenes over the former.

An experiment in which a mixture of $C_6$ hydrocarbons was extracted with 80% benzenesulfonic acid gave the following results:

*Extraction of $C_6$ hydrocarbon mixture with 0.6 volume of 80% benzenesulfonic acid*

[Temperature, 25° C.; contact time, 1 hour.]

| Compound | Feed and Raffinate Analyses, Volume Per Cent | |
|---|---|---|
| | Feed | Raffinate |
| 3-Methylpentene-1 | ⎫ | ⎫ |
| 4-Methylpentene-1 | ⎬ 2 | ⎬ 1 |
| Hexene-1 | ⎭ | ⎭ |
| 4-Methylpentene-2 | ⎫ | ⎫ |
| Hexene-2 | ⎬ 3 | ⎬ 3 |
| Hexene-3 | ⎭ | ⎭ |
| 2-Methylpentene-1 | 9 ⎫ | 4 ⎫ |
| 2-Methylpentene-2 | 16 ⎬ 25 | 12 ⎬ 16 |
| 3-Methylpentene-2 | 20 | 16 |

Superficial selectivity for 2-methylpentenes over 3-methylpentene-2, $\frac{25-16}{20-16} = 2.25/1$ While the conditions of operation in this single-step batch extraction do not necessarily represent the optimum, it is evident from the feed and raffinate analyses that a superficial selectivity of 2.25/1 favoring the 2-methylpentenes over 3-methylpentene-2 was obtained.

Polymerization rates for the methylpentenes during extraction with 80 wt. percent benzenesulfonic acid at 25° C. were $4.1 \times 10^{-4}$ mols 3-methylpentene-2 per mol acid per hour, and $2.3 \times 10^{-4}$ for the 2-methylpentenes-1 and 2. These values are considered low and are extremely satisfactory.

The acid liquor extract obtained by the absorption of the $C_6$ hydrocarbon feed by acid in the absorption vessel may be subjected to controlled steam stripping to recover the extracted tertiary olefins themselves or the tertiary alcohols in concentrated form, or the extract may be heated to polymerize the olefins to their dimers or trimers etc., or the acid extract may be used directly in effecting chemical reactions between the reacted olefins and other added reactants.

In the event it is desired to recover the 2-methylpentenes themselves the acid extract may be diluted with water to an acid concentration of 50% or above and steam stripped. At this acid concentration the 2-methylpentenes themselves are recovered. If the extract is diluted with water to an acid concentration of about 35–40% and steam stripped the 2-methylpentenes are recovered in the form of their corresponding alcohol viz. 2-methylpentanol-2.

When benzenesulfonic acid is used as the extractant, it may become contaminated with surface active agents which lead to foaming, emulsification, etc. These materials can be removed by washing the acid phase with a suitable immiscible solvent. Petroleum naphtha, benzene, etc. have been found to be particularly effective.

Other sulfonic acids, such as ethanesulfonic acid, may likewise be reconditioned in the same manner.

The extraction agents employed in the process of the invention are of two categories, viz., (1) The polybasic mineral acids such as sulfuric acids, phosphoric acid and salts yielding such acids, and (2) Materials behaving like polybasic mineral acids under hydrating conditions e. g. the organic sulfonic acids such as benzenesulfonic, ethanesulfonic acid etc. and salts yielding such acids.

Of course, mixtures of polybasic mineral acids such as a mixture of sulfuric acid and phosphoric acid; mixtures of sulfonic acids such as a mixture of benzenesulfonic acid and ethanesulfonic acid; and also mixtures of polybasic mineral acids and sulfonic acids are also included within the scope of this invention.

The term polybasic mineral acid-acting substance as employed in the claims therefore means the polybasic mineral acids and their salts, and those substances which act like mineral acids under hydrating conditions e. g. the sulfonic acids and their salts.

Having described the invention in a manner so that it may be practiced by one skilled in the art:

What is claimed is:

1. A process for the separation of 2-methylpentene-1 and 2-methylpentene-2 from a mixture thereof with C6-aliphatic hydrocarbons including other tertiary monohexenes, which comprises contacting the hydrocarbon mixture with an aqueous solution of a polybasic mineral acid-acting substance forming an aqueous acid phase containing absorbed 2-methylpentene-1 and 2-methylpentene-2 and a hydrocarbon phase containing the unabsorbed C6-aliphatic hydrocarbons, and recovering the said 2-methylpentene-1 and 2-methylpentene-2 from the acid phase.

2. A process for the separation of 2-methylpentene-1 and 2-methylpentene-2 from a mixture thereof with other tertiary monohexenes which comprises contacting the mixture with an aqueous solution of a polybasic mineral acid-acting substance, forming an aqueous acid phase containing absorbed 2-methylpentene-1 and 2-methylpentene-2 and a hydrocarbon phase containing the other tertiary monohexenes, and recovering said 2-methylpentene-1 and 2-methylpentene-2 from the acid phase.

3. A process for the separation of 2-methylpentene-1 and 2-methylpentene-2 from a mixture thereof with other tertiary monohexenes which comprises contacting the mixture with an aqueous solution of a polybasic mineral acid, forming an aqueous acid phase containing absorbed 2-methylpentene-1 and 2-methylpentene-2 and a hydrocarbon phase containing the other tertiary monohexenes, and recovering said 2-methylpentene-1 and 2-methylpentene-2 from the acid phase.

4. A process for the separation of 2-methylpentene-1 and 2-methylpentene-2 from a mixture thereof with other tertiary monohexenes which comprises contacting the mixture with an aqueous solution of an organic sulfonic acid, forming an acid phase containing absorbed 2-methylpentene-1 and 2-methylpentene-2 and a hydrocarbon phase containing the other tertiary monohexenes, and recovering said 2-methylpentene-1 and 2-methylpentene-2 from the acid phase.

5. A process according to claim 3 in which the polybasic mineral acid is sulfuric acid.

6. A process according to claim 4 in which the organic sulfonic acid is benzenesulfonic acid.

7. A process according to claim 6 in which the benzenesulfonic acid is 80 weight per cent benzenesulfonic acid.

8. A process for the separation of 3-methylpentene-2 from a mixture thereof with 2-methylpentene-1 and 2-methylpentene-2 which comprises contacting the mixture with an aqueous solution of a polybasic mineral-acid acting substance, forming an aqueous acid phase containing asborbed 2-methylpentene-1 and 2-methylpentene-2 and a hydrocarbon phase of 3-methylpentene-2, and recovering 2-methylpentene-1 and 2-methylpentene-2 from the acid phase.

9. A process according to claim 8 in which the polybasic mineral acid-acting substance is sulfuric acid.

10. A process according to claim 8 in which the polybasic mineral acid-acting substance is a sulfonic acid.

11. A process according to claim 10 in which the sulfonic acid is benzenesulfonic acid.

12. A process according to claim 11 in which the extraction takes place at a temperature in the range of $-10°$ C. to $+40°$ C.

13. A process according to claim 11 in which the extraction is carried out at $25°$ C. with 80% aqueous benzenesulfonic acid.

14. A process for the preparation of 2-methylpentanol-2 from a C6-aliphatic hydrocarbon mixture containing 2-methylpentene-1, 2-methylpentene-2 and other tertiary monohexenes which comprises contacting the hydrocarbon mixture with an aqueous solution of a polybasic mineral acid-acting substance forming an aqueous acid phase containing absorbed 2-methylpentene-1 and 2-methylpentene-2 and a hydrocarbon phase containing unabsorbed C6-aliphatic hydrocarbons, subjecting the acid phase to steam stripping, and recovering 2-methylpentanol-2 overhead from the stripping operation.

15. A process according to claim 14 in which the polybasic mineral acid-acting substance is sulfuric acid.

16. A process according to claim 14 in which the polybasic mineral acid-acting substance is benzenesulfonic acid.

17. A process according to claim 16 in which the extraction is carried out with 80% by weight aqueous benzenesulfonic acid at a temperature in the range of $-10°$ C. to $+40°$ C.

BOYD E. HUDSON, Jr.

REFERENCES CITED

The following references are of record in the file of this patent:

UNITED STATES PATENTS

| Number | Name | Date |
|---|---|---|
| 2,006,942 | Clark | July 2, 1935 |
| 2,042,212 | Deanesley | May 26, 1936 |
| 2,060,143 | Van de Griendt | Nov. 10, 1936 |